Dec. 25, 1962    J. D. BOSTROM    3,070,275
REUSABLE CONTAINER
Filed May 2, 1960
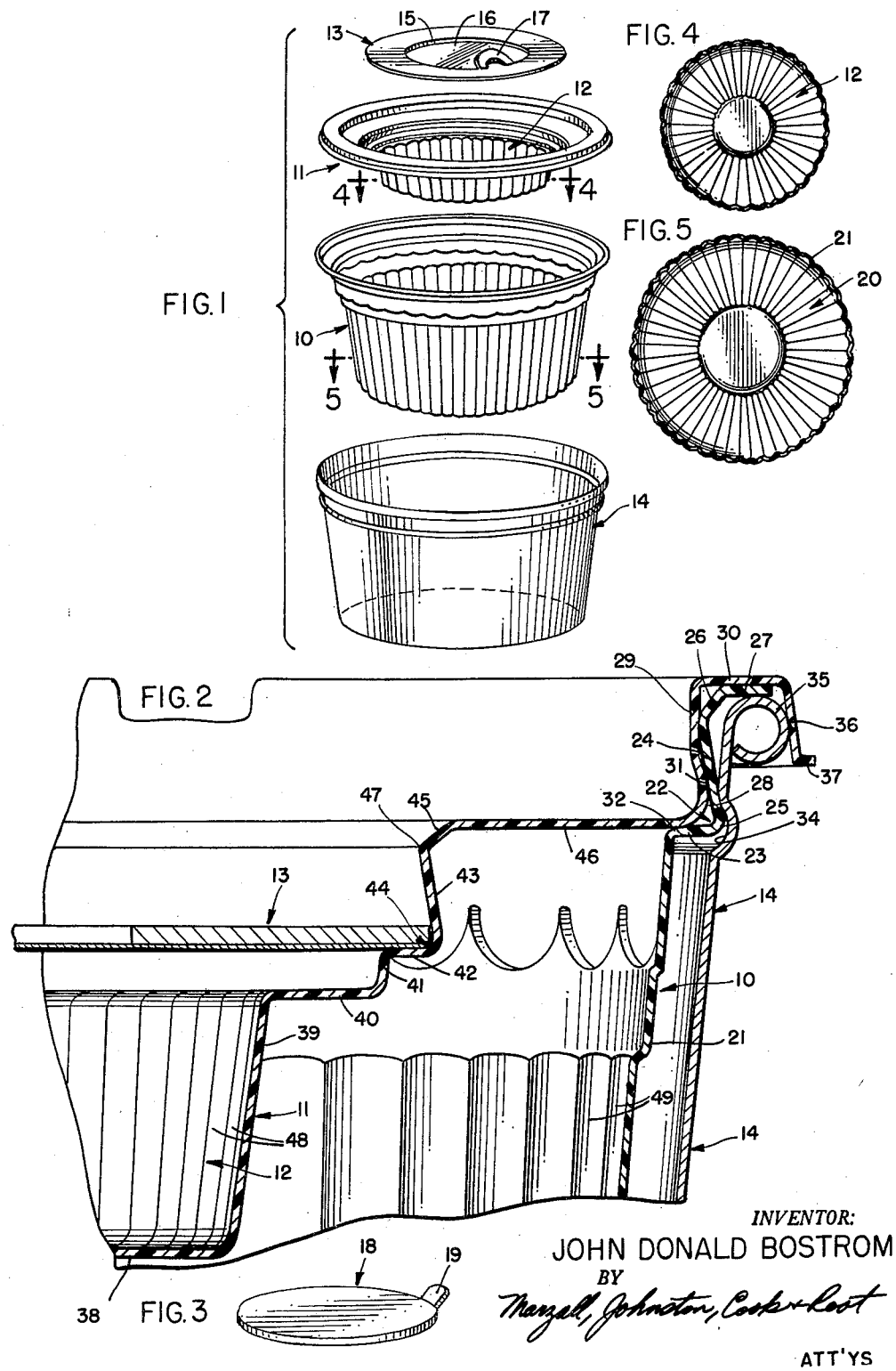
INVENTOR:
JOHN DONALD BOSTROM
BY
Manzell, Johnston, Cook & Root
ATT'YS

United States Patent Office 3,070,275
Patented Dec. 25, 1962

3,070,275
REUSABLE CONTAINER
John Donald Bostrom, Niles, Ill., assignor to Poster Packaging, Inc., Chicago, Ill., a corporation of Delaware
Filed May 2, 1960, Ser. No. 26,355
3 Claims. (Cl. 229—14)

This invention relates in general to a reusable container, and more particularly to a reusable container having a plurality of areas or chambers for receiving and packaging separated foodstuffs.

The container of the present invention is composed of preferably three pieces which after being assembled may selectively be used with a conventional relatively rigid, open mouthed container known as a "tub." The conventional tub may be constructed of waxed cardboard in the form of a cup which has been used primarily for the packaging of refrigerated foodstuffs. The container of the invention includes a cup-shaped tub sized for selective telescopic reception in a conventional tub and constructed to receive a foodstuff that may be separated from another foodstuff. A cover is provided for the tub of the present invention which includes a compartment for receiving a foodstuff separated from the foodstuff contained in the tub. Both the cover and cup-shaped tub are constructed of a transparent and flexible rapid recovery plastic enabling reuse of the container if desired. Coacting means are provided on the tub and cover to permit snap-on and sealing engagement with the cover. A conventional disc-like cover may be provided for closing the compartment in the tub cover.

Accordingly, it is an object of this invention to provide a reusable container constructed of rapid recovery plastic for use in packaging foodstuffs wherein it is desired to package more than one foodstuff in a single container.

Another object of this invention is in the provision of a light-weight container constructed of transparent and flexible rapid recovery plastic for use in packaging a plurality of foodstuffs.

Still another object of this invention resides in the provision of a container constructed of a light-weight, thin walled, flexible rapid recovery plastic having a cover that is easily removable and replaceable without causing excessive distortion or damage.

A further object of this invention is to provide a reusable container of transparent and rapid recovery plastic including a cup-shaped tub for receiving one foodstuff, a cover for the tub having a compartment for receiving another foodstuff and a cover for the compartment.

A still further object of this invention resides in the provision of a reusable container of transparent and flexible rapid recovery plastic including a cup-shaped tub for receiving one foodstuff, a cover for the tub having a compartment for receiving a second foodstuff and having means for coacting with the tub to provide sealing and snap-on engagement therewith, and a cover for the compartment in the tub cover.

Another object of this invention is to provide a reusable container of flexible rapid recovery plastic for packaging a plurality of foodstuffs, wherein the plastic is transparent thereby enabling the contents to be viewed while on display.

Still another object of this invention is in the provision of a reusable container of flexible rapid recovery plastic including a cup-shaped tub and a cover therefor, wherein the side walls and bottom of the tub are reinforced by a plurality of circumferentially arranged corrugations or flutes that are continuous between the side walls and the bottom.

Other objects, features and advantages of the invention will be apparent from the following detailed disclosure, taken in conjunction with the accompanying sheet of drawing, wherein like reference numerals refer to like parts, in which:

FIG. 1 is an exploded perspective view of the container according to the invention and illustrating its use in connection with a conventional tub;

FIG. 2 is a greatly enlarged fragmentary sectional view taken along a diameter of the container and illustrating the various parts in assembled relationship;

FIG. 3 is a perspective view of a modified cover that may be substituted for the cover illustrated in FIG. 1 for enclosing the compartment;

FIG. 4 is a sectional view taken along the line 4—4 of FIG. 1 and illustrating the bottom of the compartment in the tub cover in plan view; and FIG. 5 is a sectional view taken substantially along line 5—5 of FIG. 1 and illustrating the bottom of the tub in plan view.

Referring now to the drawings and particularly to FIG. 1, the container of the present invention includes a cup-shaped tub or open mouthed vessel, generally designated by the numeral 10, a cover for the tub generally designated by the numeral 11 and including a compartment 12, and a cover 13 for closing the compartment 12 of the tub cover 11. As illustrated in FIGS. 1 and 2, the container of the invention may be received in a conventional tub 14 which may be constructed of a rigid opaque material as the conventional waxed cardboard tub. It will be appreciated that the outer tub 14 may be constructed of other materials such as to provide a rigid containing structure. Essentially, the tub 14 does not constitute a part of the invention, but is merely shown in use with the present invention.

The cup-shaped tub 10 and tub cover 11 are formed from a flexible rapid recovery plastic that is transparent, such as clear polystyrene. If desired, the polystyrene may be tinted to any suitable color while maintaining the transparent qualities. It may be appreciated that other plastic materials have similar properties as polystyrene may also be used to construct the tub 10 and cover 11. However, the preferred material of polystyrene is distinct from such plastics as polyethylene, the latter being characterized by a slow rate of recovery. Further, the tub 10 and cover 11 may be pressure formed and die cut from a plastic sheet and would be relatively thin as compared to containers constructed of polyethylene. The polystyrene or like preferably thermoplastic, synthetic, organic, resinous material would have a thickness in the range of 5 to 20 mils, as compared to a thickness of greater than 30 mils for a polyethylene container.

The cover 13 in FIG. 1 is preferably constructed of a paperboard in the form of a disc and may have a center opening 15 closed by a sheet of transparent material 16 of any suitable type to permit viewing the contents within the compartment 12. A tab 17 may be provided integrally with the cover for engagement by the fingers of a person removing the cover from the compartment. Alternatively, the cover may be constructed of a solid piece of material as illustrated in FIG. 3 and identified by the numeral 18. The cover 18 includes an integral tab 19 for gripping to remove it from the tub cover 11. It may also be appreciated that the cover for the compartment 12 may be constructed entirely of a transparent material and possibly of polystyrene but of a different configuration than that disclosed. However, the covers 13 and 18 are of a conventional make and would be readily available at a low cost.

The cup-shaped tub 10 includes a bottom 20 and inverted frusto-conical side walls 21 integral with the bottom. At the upper end or edge of the side walls 21, an inwardly facing annular groove 22 is provided and defined by a horizontally extending panel 23 extending outwardly from the upper edge of the side walls 21, and an upstanding annular panel 24 integral with the outer free edge of the horizontal panel 23 and inclined therefrom toward the vertical center axis of the tub thereby defining an acute angle between the panels 23 and 24. The annular groove 22 also defines on the outer side of the tub an annular ridge or bead 25. At the upper edge of the panel 24, an outwardly inclined annular panel 26 is integrally connected thereto for supporting a horizontally extending annular flange 27 in cantilever fashion.

In order to provide a snap-on engagement between the tub cover 11 and the tub, an annular outwardly facing bead 28 is formed at the periphery of the tub cover for mating engagement with the annular groove 22 of the tub. Extending upwardly from the upper edge of the bead 28 is a substantially vertical annular panel 29 which engages the junction between the panels 24 and 26 of the tub in substantially sealing relationship. A horizontally extending annular flange 30 is connected to the upper edge of the panel 29 and extends outwardly therefrom to provide on its under surface sealing engagement with the upper surface of the tub flange 27. Additional substantially sealing engagement is defined between the engagement of the bead 28 with the panels 23 and 24 of the tub at points 31 and 32. As seen in FIG. 2, the outer extremity of the bead 38 is diametrically larger than the inner junction between the panels 24 and 26 of the tub thereby necessitating spreading or opening of the panels 24 and 26 to permit snap-on engagement of the cover 11 so that the bead 28 is received in the groove 22.

When inserting the container of the present invention into a conventional tub such as that generally designated by the numeral 14, it is desirable to have a locking engagement between the container and the tub so that the container may not easily be separated therefrom inadvertently. To this end, the conventional tub is provided with an annular indent 34 adjacent its upper end which terminates in a rounded bead 35, wherein the defined outwardly projecting bead 25 on the tub 10 of the container may enjoy snap-on engagement with the indent 34. Additionally, the horizontal flange 27 of the tub overlies the upper extremity of the rounded bead 35, and a downwardly extending flange 36 is provided on the outer end of the horizontal flange 30 of the tub cover 11 to telescopically slip over the outer extremity of the bead 35. If desired, the flange 36 may be eliminated, but it provides with an additional lip 37 at its lower end a means for easily grasping or gripping one edge of the cover 11 for removal thereof from the tub 10. Generally, a force applied on the flanges 36 and 37 will be carried through the tub 10 by the engagement between the cover 11 and tub 10 whereby the tub 10 will be removed with the cover 11 as a unit from the conventional tub 14.

The compartment 12 in the cover 11 is defined by a horizontally extending bottom 38 and inverted frusto-conical side walls 39. At the upper edge of the side walls 39, an annular horizontally extending panel 40 is provided which connects with a substantially vertically extending panel 41. At the upper edge of the panel 41, a horizontally and outwardly extending panel 42 is provided and has connected at its outer edge an upwardly and inwardly inclined panel 43 defining an inwardly facing annular groove 44 which tightly receives the peripheral edge of the disc cover 13. At the upper edge of the panel 43, an outwardly flaring panel 45 is provided and to which is connected a horizontally extending flange 46 which connects at its outer edge to the bead 28. The junction between the panels 43 and 45 defines an inwardly projecting ridge 47 having a smaller diametrical dimension than the groove 42 and the outer periphery of the cover 13. Thus, the cover 13 enjoys a snap-on engagement with the tub cover 11 to enclose the compartment 12. Further, engagement of the under surface along the outer periphery of the cover 13 with the upper surface of the horizontally extending panel 42 effects a sealing relationship.

As noted in FIGS. 1, 2 and 4, the side walls of the compartment 12 are provided with a plurality of vertically and circumferentially arranged flutes or corrugations 48 which merge or continue into the bottom 38 and terminate short of the center point of the bottom. Similarly, the side walls 21 and bottom 20 of the cup-shaped tub 10 include flutes or corrugations 49. These flutes and corrugations are provided for reinforcing the side walls and bottom of the compartment and tub.

Throughout the specification and claims, it will be understood that the expression "flexible rapid recovery plastic" refers to materials which are flexible to the extent that they will bend or give when pressure is applied to them. In the trade, however, these materials are usually referred to as rigid plastic materials to distinguish them from other types of plastic materials which have substantially no rigidity.

It will be understood that modifications and variations may be effected without departing from the scope of the novel concepts of the present invention, but it is understood that this application is to be limited only by the scope of the appended claims.

The invention is hereby claimed as follows:

1. A container of flexible rapid recovery plastic for use in packaging foodstuffs and adapted to be received in a rigid open-mouthed, inverted, frusto-conical paper container having an inwardly facing annular groove on its wall adjacent and parallel to the upper end thereof and the upper end of said paper container terminating in an outwardly curled bead, said plastic container comprising a cup-shaped tub and a cover for said tub, the tub having a bottom and an upstanding inverted frusto-conical side wall and an annularly outwardly extending flange along the upper end of said upstanding wall adapted to overlie the bead on the paper container, an annular indentation on said upstanding wall defining a radially inwardly facing groove and a radially outwardly extending bead paralleling and adjacent to said flange, said outwardly extending bead being adapted to engage in the inwardly facing annular groove of said paper container, said tub cover having an upwardly opening compartment therein including a bottom and an inverted frusto-conical side wall extending upwardly therefrom, said tub cover further including a first flange extending radially from the top end of said compartment side wall, a wall portion extending upwardly and inwardly from the outer periphery of said first flange defining therewith an inwardly facing groove, said tub cover further including a second flange radially extending from the upper end of said portion, a second upwardly and inwardly extending wall portion defining with said second flange a radially extending bead engaging the inwardly facing groove of said tub, a third flange connected to and extending radially from the top of said second wall portion and overlying said tub flange, and a depending skirt extending from the outer periphery of said third flange and having a diameter to snugly telescope over the paper container bead, and a flat disc-shaped cover closing said compartment and being of a size to snap fit in the inwardly facing groove of said tub cover.

2. The container of claim 1, wherein the compartment is below the flange and groove on the tub and thereby within the confines of the tub.

3. The container of claim 1, wherein the bottoms and upstanding side walls of said tub and tub cover include a plurality of circumferentially arranged corrugations.

References Cited in the file of this patent

UNITED STATES PATENTS

| | | |
|---|---|---|
| 1,375,778 | Clearwater | Apr. 26, 1921 |
| 1,529,072 | Lennox | Mar. 10, 1925 |
| 2,099,056 | Ferngren | Nov. 16, 1937 |
| 2,591,578 | McNealy et al. | Apr. 1, 1952 |
| 2,606,586 | Hill | Aug. 12, 1952 |
| 2,707,588 | Amberg | May 3, 1955 |
| 2,723,643 | Weiss | Nov. 15, 1955 |
| 2,739,751 | Bailey | Mar. 27, 1956 |
| 2,740,575 | Fontaine | Apr. 3, 1956 |
| 2,766,796 | Tupper | Oct. 16, 1956 |
| 2,790,576 | Lawrence | Apr. 30, 1957 |
| 2,947,463 | Conklin | Aug. 2, 1960 |